United States Patent Office 2,729,666
Patented Jan. 3, 1956

2,729,666
ALKYL-ARYL DIISOCYANATES WITH REDUCED ACTIVITY

Otto Stallmann, Bridgeton, N. J., assignor to E. I. du Pont de Nemours and Company, Wilmington, Del., a corporation of Delaware No Drawing. Application July 21, 1952,
Serial No. 300,128

2 Claims. (Cl. 260—453)

This invention relates to organic diisocyanates, and more particularly to isocyanates in which one of the isocyanate groups is hindered or blocked to render it relatively unreactive with most compounds having active hydrogen-containing functional groups below temperatures of about 85° C.

Recently diisocyanates have become of extreme commercial importance. Due to their chemical nature, however, they are very reactive generally with groups containing an active hydrogen such as —OH, —COOH, —NH$_2$ etc. In carrying out reactions with the isocyanates, extreme care must be exercised to prevent undesirable reactions by carefully controlling the various steps such as order of addition, temperature, presence of moisture and the like in order to avoid undesirable side reactions.

Heretofore many attempts have been made to reduce the activity of the diisocyanates by various means including blocking or hindering one of the —NCO groups. One such suggested method involves reacting the isocyanate group with a phenol or a compound containing methylene hydrogen such as a malonic ester to form adducts which regenerate the —NCO group on heating to about 150–180° C. Among the compounds which may be used to form mono adducts of diisocyanates are aceto-acetic ester; diethyl malonate; mercaptans such as 2-mercapto benzothiazole; lactams; imides such as succinimide, phthalimide and the like; tertiary amyl alcohol; dimethyl phenyl carbinol; and secondary amines such as diphenylamine. These adducts regenerate —NCO groups on heating to 100–150° C.

It is also well known that dimeric aromatic isocyanates such as the dimer of phenyl isocyanate regenerate the original isocyanate on heating to 150–180° C.

Both the adduct and dimer methods of forming blocked isocyanate groups require heating to a high temperature to free the isocyanate group. Unfortunately, this is frequently impossible due to various reasons such as the shape and dimensions of the object containing them which preclude placing the object in an oven, or due to the adverse effects on the objects by high temperatures. These requirements for the liberation of the —NCO group obviously place restrictions and inconvenience on their use.

It is therefore an object of the present invention to reduce the activity of one of the —NCO groups in organic diisocyanates at temperatures below about 85° C. Another object is the provision of a diisocyanate having one relatively active —NCO and one relatively inactive —NCO group. Other objects will be apparent as the description of the invention proceeds.

These and other objects are accomplished by compounds which have the general formula:

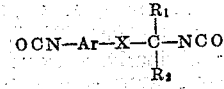

in which Ar is an aromatic nucleus which may be substituted or unsubstituted; R$_1$ and R$_2$ are aliphatic hydrocarbons having up to 8 carbon atoms which together with the carbon atom may form part of a cycloaliphatic ring such as cyclohexyl; and X is a bridging means which may be a simple chemical bond or an alkylene, arylene, polyvalent non-metallic element, hetero group i. e. a group containing a hetero atom, etc.

The aromatic nucleus is preferably the benzene ring although the naphthalene ring is quite usable as well as the anthracene and more complex ring systems. The aromatic ring may be substituted with groups which are non-reactive with —NCO groups such as alkyl or halogen. The alkyl groups attached to the tertiary aliphatic carbon bearing the —NCO group are usually selected from methyl, ethyl, propyl, isopropyl, butyl, etc. Since the principal function is to shield the —NCO group, there is no object in having too long a chain length in these groups. About 6–8 carbon atoms may be considered a practical upper limit above which preparation is more difficult and no advantage is obtained. On the other hand, the two bonds together with the carbon atom may form part of a cyclo aliphatic radical such as a cyclohexyl group.

The bridging means X is not per se a critical part of the compound. The character of the bridge does affect other characteristics such as solubility in various solvents and whether the diisocyanate is a liquid or a solid. The following types are representative, but other divalent groups may be used:

TABLE I

Simple C—C bond

—(CH$_2$)$_n$—, where $n$ is an integer from 1 to 8

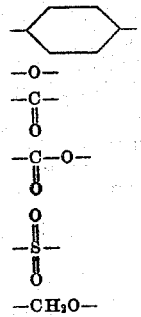

—CH$_2$O—

Several general methods are useful for the preparation of starting materials from which the diisocyanates of this invention can be made. One method, disclosed by H. B. Hass and co-workers (J. Am. Chem. Soc. 71, 2290 and 3482), is based on the carbon alkylation which occurs when p- (or o-) nitrobenzylchloride, or the corresponding nitrohalogen compounds in which the halogen is separated from the aromatic nucleus by a higher alkyl bridge, are reacted under controlled conditions with the alkali metal salts of secondary nitroparaffins. The dinitro compounds thus obtained can readily be reduced to the diamines from which typical diisocyanates of this invention can be made by phosgenation.

Another method takes advantage of the Hofmann's degradation method for making amines from acid amides, with the refinements reported in 1930 by Montagne and Casteran (Compt. rend. 191, 139) and by C. Mentzer (Compt. rend. 213, 581) who applied this method successfully to the preparation of aryl-tert. alkylamines from the corresponding acid amides. Diamines which by phosgenation give the diisocyanates of this invention, can be prepared by nitrating the above-mentioned monoamines (after the amino group has been protected, for instance by acetylation), whereby a nitro group is introduced in the aromatic part of the molecule, followed by reduction of the nitro to the amino group, and removing the protecting group from the aliphatic amine by hydrolysis. In some cases the nitroaryl-tert. alkylamines can be directly synthesized by subjecting the corresponding acid amides containing a nitro group as a substituent in the aromatic part of the molecule to the Hofmann degradation process, followed by reduction of the resulting nitro-amino compounds to the desired diamines.

A useful method by which pertinent diamines can be synthesized, takes advantage of the reaction disclosed in 1948 by Ritter and Kalish in J. Am. Chem. Soc. 70, 4048. According to this method, tertiary mono-carbinamines are obtained by hydrolysis of the corresponding N-alkyl formamides which, in turn, are made by reacting tertiary alcohols in a mixture of acetic acid and sulfuric acid with sodium cyanide. The desired amines can be obtained either by using from the start a nitro-aryl-tertiary akyl alcohol which is subjected to the Ritter reaction, followed by reduction of the nitro-amino compound, or else the nitro group can later be introduced into the aryl nucleus by the above-indicated method involving nitration of the carbinamine, followed by reduction and hydrolysis.

The phosgenation of the diamines is carried out in the usual manner, for instance, by treating the dihydrochlorides of the diamines, suspended or dissolved in common solvents such as toluene or o-dichlorobenzene, at elevated temperatures with phosgene gas.

Typical examples of these diisocyanates are:

(1)

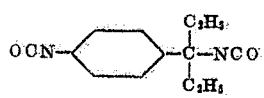

which may be prepared by phosgenating the dihydrochloride of the diamine made from diethyl (p-nitrophenyl) acetamide by the same process that was used by Montagne and Casteran (Compt. rend. 191, 141) for synthesizing the corresponding mono-amine from diethylphenylacetamide, or by subjecting the acetyl compound from this mono-amine to nitration, reduction, hydrolysis and phosgenation of the dihydrochloride of the resulting diamine.

(2)

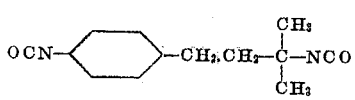

which may be made by reducing 3-methyl-3-nitro-1-(p-nitro-phenyl)-butane (J. Am. Chem. Soc. 71, page 3485) to the diamine which can be converted to the dihydrochloride and phosgenated by the method disclosed in Example I.

(3)

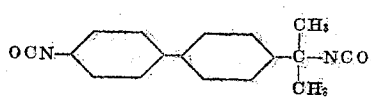

which is made by phosgenating the corresponding diamine. This diamine may be prepared by nitrating the acetylated mono-amine which is made from the below-described tertiary alcohol by the above-described Ritter reaction, followed by reduction and hydrolysis. The tertiary alcohol is made by subjecting biphenyl-p-carboxylic acid methyl ester to a Grignard reaction with magnesium methyliodide, similar to the method disclosed by Schlenk (Ann. 368, 298–299) for synthesizing the corresponding triarylcarbinol compound. The nitro group also can first be introduced in the aromatic part of the molecule by nitrating the tertiary alcohol, replacing the aliphatic hydroxy group with the amino group by the Ritter reaction, and then reducing the nitro-amino compound to the desired diamine.

(4)

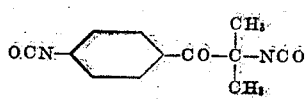

which may be prepared by reacting 4-nitrobenzoic acid chloride with the sodium salt of 2-nitropropane, reducing the dinitro compound to the corresponding diamine and phosgenating.

(5)

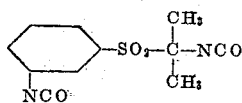

which may be prepared by reacting m-nitrobenzene sulfonyl chloride with the sodium salt of 2-nitropropane, reducing the dinitro compound to the diamine and phosgenating.

(6)

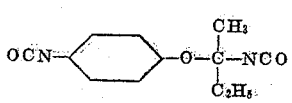

which may be prepared by reacting 2-nitrobutane with iodine and potassium iodide to give 2-nitro-2-iodo-butane which is then reacted with the sodium salt of p-aminophenol, the nitro group is reduced to the amine and the resulting diamine is phosgenated.

(7)

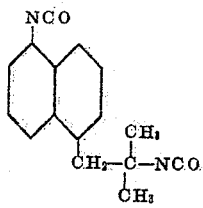

which may be prepared by treating alpha-nitronaphthalene with formaldehyde and hydrochloric acid to form 1-nitro-5-chloromethyl naphthalene which is then reacted with the sodium salt of 2-nitropropane. The dinitro compound is hydrogenated to the diamine and then phosgenated. Other types are illustrated in the examples.

The organic diisocyanates of this invention have the very important characteristic of having one —NCO group which reacts normally with compounds containing active hydrogen atoms, i. e., —OH, —NH₂, —COOH, =NH, etc., and having one —NCO group which is shielded and less reactive at ordinary temperatures, that is, in the range of 15–40° C. The shielded —NCO group, however, will react when the temperature is raised to about 70–90° C.

In the case of strongly basic lower aliphatic amines, specifically those with less than 4 carbon atoms, the shielded —NCO group will react at temperatures lower than 70–90° C. These compounds are an exception to the general lack of reactivity shown by compounds containing active hydrogen towards the shielded —NCO group at temperatures below 70–90° C.

These diisocyanates are thus very valuable reactants in a number of instances where it is desirable to react preferentially one end of a bifunctional molecule with one compound and then react the other end with a different compound. Isocyanate groups are particularly valuable in many applications because they react with a number of groups by the formation of urethane or urea type linkages without the formation of byproducts. In this particular respect the diisocyanates are considerably superior to the adducts of the prior art where one molecule of a foreign material is generated for each —NCO group freed.

Furthermore, the shielded —NCO group of these new diisocyanates, while inert at room temperature, becomes available for reaction normally at temperatures as low as 70–75° C., compared to 100–150° C. required for the adducts. This is obviously a tremendous advantage. These alkyl shielded —NCO groups also appear to have a sharper line of demarcation between their active and inactive temperature ranges than do the shielded aromatic —NCO groups of the prior art.

The outstanding superiority of the diisocyanates of this invention over the known aromatic diisocyanates in which one of the —NCO groups is shielded by a methyl group in ortho position, was strikingly demonstrated in a practical test when an attempt was made to employ the best available aromatic diisocyanate with a shielded —NCO group (toluene-2,4-diisocyanate) as the cross-linking and heat-hardening agent in a lacquer based on castor oil modified alkyd resin. Almost immediately after the addition of the aromatic diisocyanate, and before this lacquer could be applied to the metal surface, both isocyanate groups in the toluenediisocyanate reacted at room temperature with the free hydroxy group in the film-forming resin, causing premature cross-linking and complete gelling of the lacquer. However, when the product of Example I was used as the cross-linking agent under otherwise strictly comparable conditions, the lacquer remained in very satisfactory condition and was without any difficulty applied (after 16 hours of storage at room temperature) to the metal surface by the conventional spraying technique. A simple heat curing treatment produced on the coated metal surface a uniformly hardened enamel of outstandingly good properties.

The following examples are given by way of illustration, but it is to be understood the invention is not limited to these specific examples, since any of the bridging groups mentioned above may be introduced as indicated by correspondingly varying the procedures given in the examples. It will also be understood that where the tertiary carbon has two methyl groups attached to it in Example I, these may be replaced by other aliphatic hydrocarbon groups having up to 8 carbon atoms.

*Example I*

50 parts of p-(2-aminoisobutyl) aniline, prepared according to J. A. C. S. 71, 2291 (1949), was dissolved in 1430 parts of o-dichlorobenzene and was gassed with HCl at room temperature until no more amine-dihydrochloride was formed, which required about 2 hours. The suspension of crystalline dihydrochloride was heated to 130° C. and 341 parts of phosgene was passed in while stirring during the course of 6 hours at 130–135° C. A clear pale yellow solution resulted. Dried nitrogen was passed through to remove dissolved phosgene and the o-dichlorobenzene was distilled off under 8 mm. pressure. The crude residue was a pale brown oil weighing 72 parts. This was fractionated at 8 mm. pressure and 57 parts boiling at 145–146° C. was collected as the main fraction. It was a water white liquid of pleasant odor analyzed 39.2% —NCO compared to a calculated value of 38.85% for a compound of the formula:

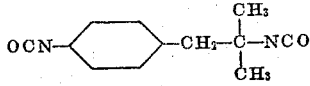

The analysis was made in the conventional manner by titration with n-butylamine.

When the diamine in which one of the methyl groups is replaced by an ethyl group (disclosed in J. Am. Chem. Soc. 71, page 2291) is phosgenated by the same procedure, the corresponding diisocyanate is obtained.

*Example II*

50 parts of alpha-(1-aminocyclohexyl)-p-toluidine, prepared according to J. A. C. S. 71, 2291 (1949), was dissolved in 1300 parts of o-dichlorobenzene and gaseous HCl was passed in at room temperature until no more amine-dihydrochloride precipitated. The crystalline suspension was heated to 100° C. and 230 parts of phosgene was passed in while stirring and gradually raising the temperature from 100° to 130° C. over a period of 4 hours. A clear pale yellow solution was obtained. Dry nitrogen was blown through the solution to remove dissolved phosgene and the o-dichlorobenzene was distilled off at 24 mm. pressure and a final temperature of 100° C. 61 parts of a pale brown oil was obtained. This was fractionated at 3 mm. and 58 parts of a main fraction boiling at 168–169° C. was collected. It was a water white liquid of pleasant odor which was soluble in dioxane, benzene, and ether. Analysis for —NCO showed 33.0% compared to a calculated value of 32.8% for

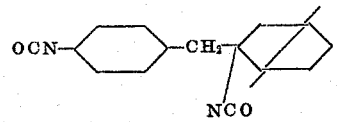

The corresponding diisocyanate containing the cyclopentyl radical instead of cyclohexyl, is obtained by phosgenating the corresponding diamine which is also disclosed in J. Am. Chem. Soc. 71, page 2291.

The hindered diisocyanates prepared according to the present invention are useful when it is desired to carry out a reaction partially and to reserve one —NCO group for subsequent reaction. In this manner lacquers and adhesives may be formulated at room temperature in which the aromatic —NCO group is reacted with an active hydrogen of one of the components. The product may then be applied to a surface as a lacquer or as an adhesive. After the solvent has been allowed to evaporate, if one is used, the surface is then heated to 70–90° C., whereupon the alkyl —NCO group reacts with other active hydrogen groups to cross-link and form insoluble resins.

In the past, lacquers or adhesives made up with unhindered diisocyanates had a very short useful pot life which seldom was over 1–4 hours without setting up. When the hindered diisocyanates of the present invention are employed, the products remain useable for 24 hours, and under some conditions, this time may be extended to 48 to 60 hours. Another advantage of the present invention is that the hindered alkyl —NCO group is affected very slowly by water, and hence it is unnecessary to exclude moist air.

The diisocyanates of the present invention are also useful as anchoring substance. The aromatic —NCO group may be reacted with a component such as a water-repellant or a dye, and this reacted product may be applied to a substrate containing active hydrogen atoms, such as cellulosic material, and then heated to 70–90° C. to activate the hindered alkyl —NCO group which ultimately gives a chemical bond between the coating and the substrate.

The products of the present invention may also be used in a similar manner for manufacturing molded articles which can be cured by heating to 70–90° C.

It will be apparent that many widely different embodiments of this invention may be made without departing from the spirit and scope thereof, and therefore it is not intended to be limited except as indicated in the appended claims.

I claim:

1. An organic diisocyanate having one of its —NCO groups attached to an aromatic radical and its other —NCO group attached to a carbon bearing two lower aliphatic hydrocarbon groups which may be joined together to form a cycloaliphatic ring with the attached carbon, the said carbon being attached to the said aromatic radical.

2. A diisocyanate having the following formula:

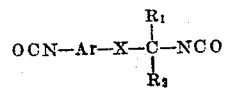

in which Ar is an aromatic nucleus; the R's are aliphatic hydrocarbon radicals having up to 8 carbon atoms which may be joined together to form a cycloaliphatic ring with the attached carbon; and X is selected from the group consisting of a C—C bond, an alkylene radical, an arylene radical, a polyvalent non-metallic element, and a bivalent radical having a polyvalent non-metallic element interrupting a carbon chain.

References Cited in the file of this patent

UNITED STATES PATENTS 2,621,166    Schmidt et al. _____ Dec. 9, 1952

OTHER REFERENCES

Bayer: Angew. Chem., vol. 59 (September 1947), pg. 264.